United States Patent [19]
Kawaguchi et al.

[11] Patent Number: 5,975,859
[45] Date of Patent: Nov. 2, 1999

[54] CONTROL VALVE IN VARIABLE DISPLACEMENT COMPRESSOR AND ITS ASSEMBLING METHOD

[75] Inventors: Masahiro Kawaguchi; Ken Suitou; Takuya Okuno; Eiji Tokunaga; Kenji Takenaka, all of Kariya, Japan

[73] Assignee: Kabushiki Kaisha Toyoda Jidoshokki Seisakusho, Aichi-ken, Japan

[21] Appl. No.: 09/010,283

[22] Filed: Jan. 21, 1998

[30] Foreign Application Priority Data

Jan. 21, 1997 [JP] Japan ................................. 9-008789

[51] Int. Cl.$^6$ ................................................ F04B 49/00
[52] U.S. Cl. ........................................ 417/222.2; 417/213
[58] Field of Search .............................. 417/213, 222.2; 137/907; 251/129.02, 61.5

[56] References Cited

U.S. PATENT DOCUMENTS 5,145,326 9/1992 Kimura et al. ..................... 417/222.2

FOREIGN PATENT DOCUMENTS 0628722 12/1994 European Pat. Off. .
07180659 7/1995 Japan .

*Primary Examiner*—Willis R. Wolfe
*Assistant Examiner*—Mahmoud M. Gimie
*Attorney, Agent, or Firm*—Morgan & Finnegan, L.L.P.

[57] ABSTRACT

A control valve for a variable displacement compressor. The control valve has a valve body for regulating a gas passage. A bellows actuates the valve body in accordance with an operating pressure introduced to a pressure sensing chamber. A solenoid biases the valve body with a force based on the electric current supplied to the solenoid. A cylindrical cap is fitted to a cylindrical portion provided on a housing of the control valve. The bellows is located in the pressure sensing chamber. The axial position of the cap in relation to the cylindrical portion is adjusted such that the bellows is positioned at a specific initial position when a pressure having a predetermined magnitude is introduced to the pressure sensing chamber and when a current having a predetermined value is supplied to the solenoid. The cap is secured to the cylindrical portion by crimping with the bellows positioned at the initial position.

23 Claims, 9 Drawing Sheets

CONTROL VALVE IN VARIABLE DISPLACEMENT COMPRESSOR AND ITS ASSEMBLING METHOD

BACKGROUND OF THE INVENTION

The present invention relates to a displacement control valve incorporated in variable displacement compressors that are used in vehicle air conditioners Japanese Unexamined Patent Publication No. 7-180659 discloses one type of a variable displacement compressor. As shown in FIG. 9, the compressor includes a cylinder block 204 and a rear housing 205 secured to each other with a valve plate 206 in between. A supply passage 202 is defined in the cylinder block 204 and the rear housing 205. The rear housing 205 includes a discharge chamber 201 and a suction chamber 208. The discharge chamber 201 is connected to a crank chamber (not shown) by the supply passage 202. The supply passage 202 is regulated by a displacement control valve 203. The control valve 203 controls the opening amount or the supply passage 202 in accordance with the cooling load thereby adjusting the amount of highly pressurized refrigerant gas that is supplied to the crank chamber from the discharge chamber 201. Accordingly, the pressure in the crank chamber is changed. Changes in the crank chamber pressure alter the difference between the pressure in the crank chamber and the pressure in cylinder bores (not shown). This adjusts the inclination of a swash plate (not shown) of the compressor and ultimately changes the displacement of the compressor.

The control valve 203 includes a reed valve flap 207 for opening and closing the supply passage 202. The reed valve flap 207 is located on the valve plate 206. The rear housing 205 further has a pressure sensing chamber 209 defined therein. The chamber 209 is communicated with the suction chamber 208 and accommodates a bellows 210. The bellows 210 functions as a pressure reacting member that is expanded and collapsed in accordance with the pressure in the suction chamber 208. The distal end of the bellows 210 is coupled to a rod 211. The distal end of the rod 211 contacts the reed valve plate 207. The rod 211 transmits expansion and contraction of the bellows 210 to the valve plate 207. Accordingly, the valve plate 207 opens or closes the supply passage 202.

The pressure sensing chamber 209 opens to the rear end of the rear housing 205. The opening is machined to form a threaded portion 212 for receiving a threaded plug 213, to which the bellows 210 is fixed. The plug 213 also has a recess 213a defined in its rear end for receiving a fastening tool. The plug 213, to which the bellows 210 is fixed, is screwed into the threaded portion 212 by rotating the plug 213 by a fastening tool engaged with the recess 213a. In this manner, the bellows 210 is installed in the pressure sensing chamber 209. At this time, the initial position of the bellows 210 in the axial direction is determined by the position of the plug 213, which is determined by the number of rotation it is given. The initial position of the bellows 210 determines the responsiveness of the reed valve 207 to the pressure in the suction chamber 208.

However, in the control valve 203, the threaded portion 212 is formed in the wall of an opening of the pressure sensing chamber 209, and the plug 213 must be threaded to correspond to the threaded portion 212. This complicates the manufacture and assembly of the control valve 203 and increases the cost.

Also, it is difficult and troublesome to accurately determine the initial position of the bellows 210 in the axial direction by changing the position of the plug 213. After determining the initial position of the bellows 210, operation of the compressor in a vehicle can displace the bellows 210 from the determined initial position.

SUMMARY OF THE INVENTION

Accordingly, it is an objective of the present invention to provide a variable displacement compressor control valve in which the initial position of a pressure reacting member is easily and accurately determined and the determined initial position of the member is positively maintained, and to provide a method for assembling such a control valve.

To achieve the above objective, the present invention provides a control valve for adjusting the amount of gas flowing in a gas passage in accordance with an operating pressure applied to the control valve. The control valve comprises a housing having a valve opening located in the gas passage, a valve body movably accommodated in the housing to adjust the size of the valve opening, a reacting member for reacting to the operating pressure, and a transmitting member located between the reacting member and the valve body to transmit the reaction of the reacting member to the valve body. A cylindrical portion is provided on the housing. A cylindrical cap is fitted to the cylindrical portion. The reacting member is located between the cylindrical portion and the cap. The position of the reacting member is adjusted by altering the axial position of the cap in relation to the cylindrical portion. The cap is secured to the cylindrical portion with the reacting member positioned at a specific initial position.

The control valve is appropriate for a variable displacement compressor that adjusts the discharge displacement in accordance with the inclination of a drive plate located in a crank chamber.

Also, the present invention provides a method for assembling the control valve. The method comprises the steps of: fitting a cylindrical cap to a cylindrical portion provided on the housing, wherein the reacting member is located between the cylindrical portion and the cap, and wherein the position of the reacting member is changed by altering the axial position of the cap in relation to the cylindrical portion; adjusting the axial position of the cap in relation to the cylindrical portion such that the reacting member is positioned at a specific initial position when a pressure having a predetermined magnitude is applied to the control valve; and securing the cap to the cylindrical portion with the reacting member positioned at the initial position.

The control valve may include a solenoid for actuating the valve body. The solenoid biases the valve body with a force based on a value of electric current supplied to the solenoid when the solenoid is excited by the supply of the current.

The present Invention further provides a method for assembling the control valve that includes the solenoid. The method comprises the steps of: fitting a cylindrical cap to a cylindrical portion provided on the housing, wherein the reacting member is located between the cylindrical portion and the cap, and wherein the position of the reacting member is changed by altering the axial position of the cap in relation to the cylindrical portion; adjusting the axial position of the cap in relation to the cylindrical portion such that the reacting member is positioned at a specific initial position when a pressure having a predetermined magnitude is applied to the control valve and when a current having a predetermined value is supplied to the solenoid; and securing the cap to the cylindrical portion with the reacting member positioned at the initial position.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A variable displacement compressor control valve according to a first embodiment of the present invention will now be described with reference to FIGS. 1 to 4.

Figure 2:
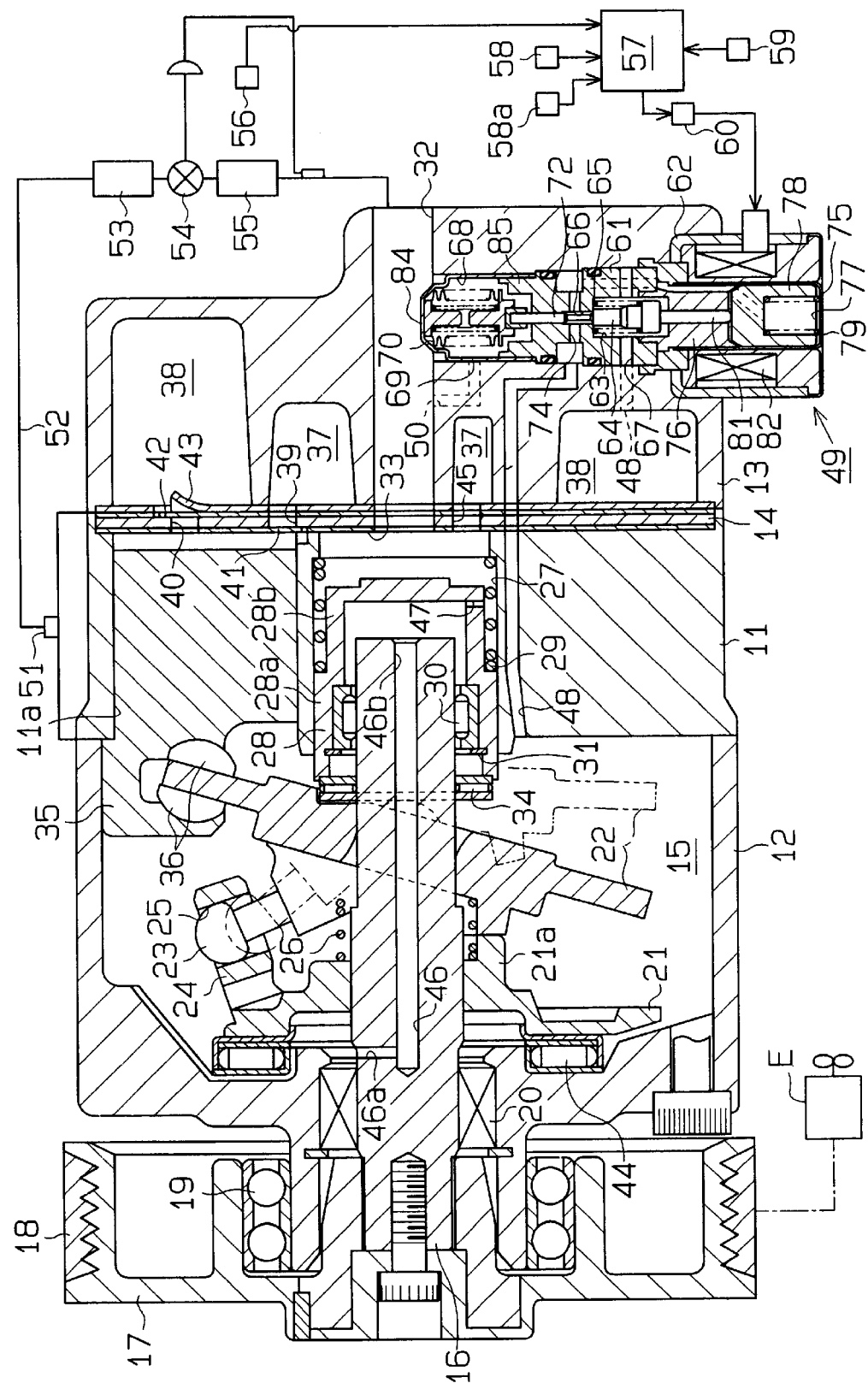
FIG. 2 is a cross-sectional view illustrating a variable displacement compressor including the control valve of FIG. 1.

Firstly, the structure of a variable displacement compressor will be described. As shown in FIG. 2, a front housing 12 is secured to the front and face of a cylinder block 11. A rear housing 13 is secured to the rear end face of the cylinder block 11 with a valve plate 14. A crank chamber 15 is defined by the inner walls of the front housing 12 and the front end face of the cylinder block 11.

A drive shaft 16 is rotatably supported in the front housing 12 and the cylinder black 11. The front end of the drive shaft 16 protrudes from the crank chamber 15 and is secured to a pulley 17. The pulley 17 is directly coupled to an external drive source (a vehicle engine E in this embodiment) by a belt 18. The compressor of this embodiment is a clutchless type variable displacement compressor having no clutch between the drive shaft 16 and the external drive source. The pulley 17 is supported by the front housing 12 with an angular bearing 19. The angular bearing 19 transfers thrust and radial loads that act on the pulley 17 to the housing 12.

A lip seal 20 is located between the drive shaft 16 and the front housing 12 for sealing the crank chamber 15. That is, the lip seal 20 prevents refrigerant gas in the crank chamber 15 from leaking outside.

A disk-like swash plate 22 is supported by the drive shaft 16 in the crank chamber 15 to be slidable along and tiltable with respect to the axis of the shaft 16. The swash plate 22 is provided with a pair of guiding pins 23, each having a guide ball at the distal end. The guiding pins 23 are fixed to the swash plate 22. A rotor 21 is fixed to the drive shaft 16 in the crank chamber 15. The rotor 21 rotates integrally with the drive shaft 16. The rotor 21 has a support arm 24 protruding toward the swash plate 22. A pair of guide holes 25 are formed in the support arm 24. Each guide pin 23 is slidably fitted into the corresponding guide hole 25 The cooperation of the arm 24 and the guide pins 23 permits the swash plate 22 to rotate together with the drive shaft 16. The cooperation also guides the tilting of the swash plate 22 and the movement of the swash plate 22 along the axis of the drive shaft 16. As the swash plate 22 slides backward toward the cylinder block 11, the inclination of the swash plate 22 decreases.

A coil spring 26 is located between the rotor 21 and the swash plate 22. The spring 26 urges the swash plate 22 backward, or in a direction to decrease the inclination of the swash plate 22. The rotor 21 is provided with a projection 21a on its rear end face. The abutment of the swash plate 22 against the projection 21a prevents the inclination of the awash plate 22 beyond the predetermined maximum inclination.

Figure 3:
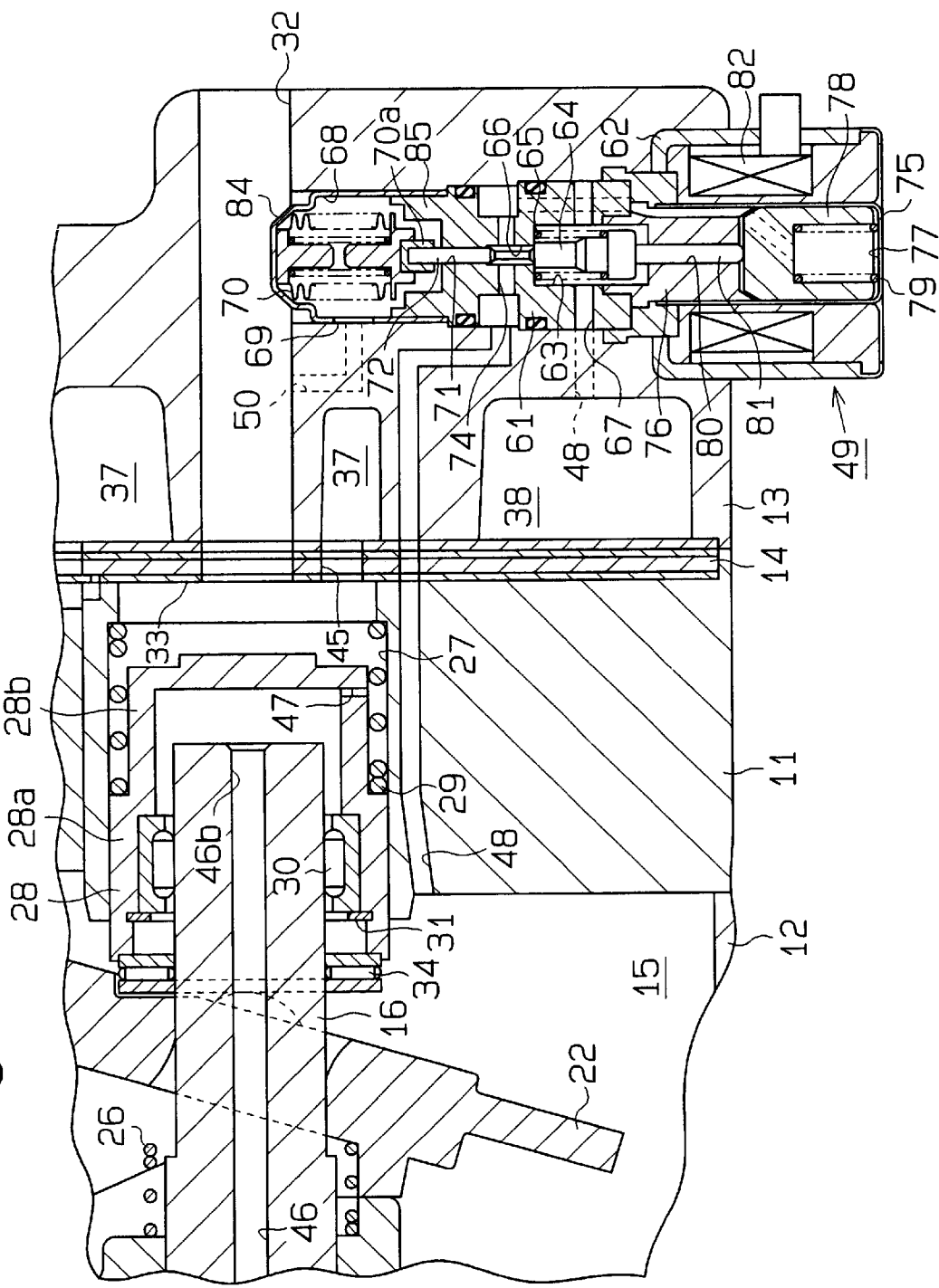
FIG. 3 is an enlarged partial cross-sectional view illustrating a compressor when the inclination of the swash plate is maximum.
Figure 4:
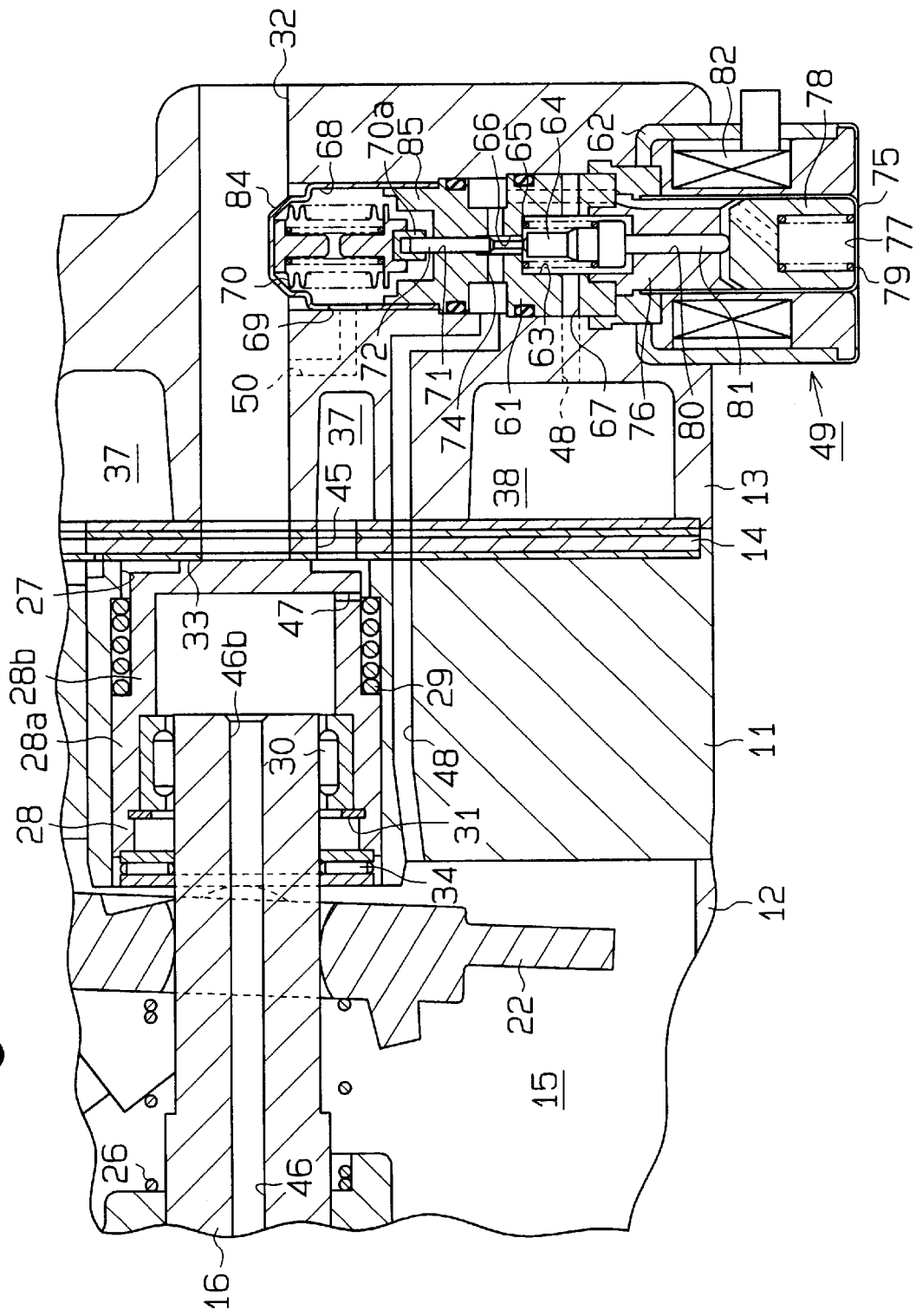
FIG. 4 is an enlarged partial cross-sectional view illustrating a compressor when the inclination of the swash plate is minimum.

As shown in FIGS. 2 to 4, a shutter chamber 27 is defined at the center portion of the cylinder block 11 extending along the axis of the drive shaft 16. A hollow cylindrical shutter 28 having a closed end is accommodated in the shutter chamber 27. The shutter 28 slides along the axis of the drive shaft 16. The shutter 28 has a large diameter portion 28a and a small diameter portion 28b. A coil spring 29 is located between a step, which is defined between the large diameter portion 28a and the small diameter portion 28b, and a wall of the shutter chamber 27. The coil spring 29 urges the shutter 28 toward the swash plate 22.

The rear end of the drive shaft 16 is inserted in the shutter 28. The radial bearing 30 is fixed to the inner wall of the large diameter portion 28a of the shutter 28 by a snap ring 31. Therefore, the radial bearing 31 moves with the shutter 28 along the axis of the drive shaft 16. The rear end of the drive shaft 16 is supported by the inner wall of the shutter chamber 27 with the radial bearing 30 and the shutter 28 in between.

A suction passage 32 is defined at the center portion of the rear housing 13 and the valve plate 14. The passage 32 extends along the axis of the drive shaft 16 and is communicated with the shutter chamber 27. A positioning surface 33 is formed on the valve plate 14 about the inner opening of the suction passage 32. The rear end of the shutter 28 abuts against the positioning surface 33. Abutment of the shutter 28 against the positioning surface 33 prevents the shutter 28 from further moving backward away from the rotor 21. The abutment also disconnects the suction passage 32 from the shutter chamber 27.

A thrust bearing 34 is supported on the drive shaft 16 and is located between the swash plate 22 and the shutter 28. The thrust bearing 34 slides along the axis of the drive shaft 16. The force of the coil spring 29 constantly retains the thrust bearing 34 between the swash plate 22 and the shutter 28. The thrust bearing 34 prevents the rotation of the swash plate 22 from being transmitted to the shutter 28.

The swash plate 22 moves backward as its inclination decreases. As it moves backward, the swash plate 22 pushes the shutter 28 backward with the thrust bearing 34. Accordingly, the shutter 28 moves toward the positioning surface 33 against the force of the coil spring 29. As shown in FIG. 4, when the swash plate 22 reaches the minimum inclination, the rear end of the shutter 28 abuts against the positioning surface 33. In this state, the shutter 28 is located at the closed position for disconnecting the shutter chamber 27 from the suction passage 32.

As shown in FIG. 2, cylinder bores 11a extend through the cylinder block 11 and are located about the axis is of the drive shaft 16, A single-headed piston 35 is accommodated in each cylinder bore 11a. Each piston 35 is operably coupled to the swash plate 22 by a pair of shoes 36. The swash plate 22 is rotated by the drive shaft 16 through the rotor 21. The rotating movement of the swash plate 22 is transmitted to each piston 35 through the shoes 36 and is converted to linear reciprocating movement of each piston 35 in the associated cylinder bore 11a.

An annular suction chamber 37 is defined in the rear housing 13 about the suction passage 32. The suction chamber 37 is communicated with the shutter chamber 27 via a communication hole 45. An annular discharge chamber 38 is defined around the auction chamber 37 in the rear housing 13. Suction ports 39 and discharge ports 40 are formed in the valve plate 14. Each suction port 39 and each discharge port 40 correspond to one of the cylinder bores 11a. Suction valve flaps 41 are formed on the valve plate 14. Each suction valve flap 41 corresponds to one of the suction ports 39. Discharge valve flaps 42 are formed on the valve plate 14. Each discharge valve flap 42 corresponds to one of the discharge ports 40.

As each piston 35 moves from the top dead center to the bottom dead center in the associated cylinder bore 11a, refrigerant gas in the suction chamber 37 enters each piston bore 11a through the associated suction port 39 while causing the associated suction valve flap 41 to flex to an open position. As each piston 35 moves from the bottom dead center to the top dead center in the associated cylinder bore 11a, refrigerant gas is compressed in the cylinder bore 11a and is discharged to the discharge chamber 38 through the associated discharge port 40 while causing the associated discharge valve flap 42 to flex to an open position. Retainers 43 are formed on the valve plate 14. Each retainer 43 corresponds to one of the discharge valve flaps 42. The opening amount of each discharge valve flap 42 is defined by contact between the valve flap 42 and the associated retainer 43.

A thrust bearing 44 is located between the front housing 12 and the rotor 21. The thrust bearing 44 carries the reactive force of gas compression acting on the rotor 21 through the pistons 35 and the swash plate 22.

As shown in FIGS. 2–4, a pressure release passage 46 it defined at the center portion of the drive shaft 16. The pressure release passage 46 has an inlet 46a, which opens to the crank chamber 15 in the vicinity of the lip seal 20, and an outlet 46b, which opens to the interior of the shutter 28. A pressure release hole 47 is formed in the peripheral wall near the rear end of the shutter 28. The hole 47 communicates the interior of the shutter 28 with the shutter chamber 27.

A supply passage 48 is defined In the rear housing 13, the valve plate 14 and the cylinder block 11. The supply passage 48 communicates the discharge chamber 38 with the crank chamber 15. A displacement control valve 49 is accommodated in the rear housing 13 midway in the supply passage 48. A pressure introduction passage 50 is defined in the rear housing 13. The passage 50 communicates the control valve 49 with the suction passage 32, thereby introducing suction pressure Ps into the control valve 49.

An outlet port 51 is defined in the cylinder block 11 and is communicated with the discharge chamber 38. The outlet port 51 is connected to the suction passage 32 by an external refrigerant circuit 52. The external refrigerant circuit 52 includes a condenser 53, an expansion valve 54 and an evaporator 55. A temperature sensor 56 is located in the vicinity of the evaporator 55. The temperature sensor 56 detects the temperature of the evaporator 55 and issues signals relating to the detected temperature to a control computer 57. The computer 57 is connected to various devices including a temperature adjuster 58, a compartment temperature sensor 58a and an air conditioner starting switch 59. A passenger sets a desirable compartment temperature, or a target temperature, by the temperature adjuster 58.

The computer 57 inputs signals relating to a target temperature from the temperature adjuster 58, a detected evaporator temperature from the temperature sensor 56, and a detected compartment temperature from the temperature sensor 58a. Based on the inputted signals, the computer 57 commands a driving circuit 60 to send an electric current having a certain magnitude to the coil 82 of a solenoid 62, which will be described later, in the control valve 49. In addition to the above listed data, the computer 57 may use other data such as the temperature outside the compartment and the engine speed E for determining the magnitude of electric current sent to the control valve 49.

The structure of the control valve 49 will now be described.

Figure 1:
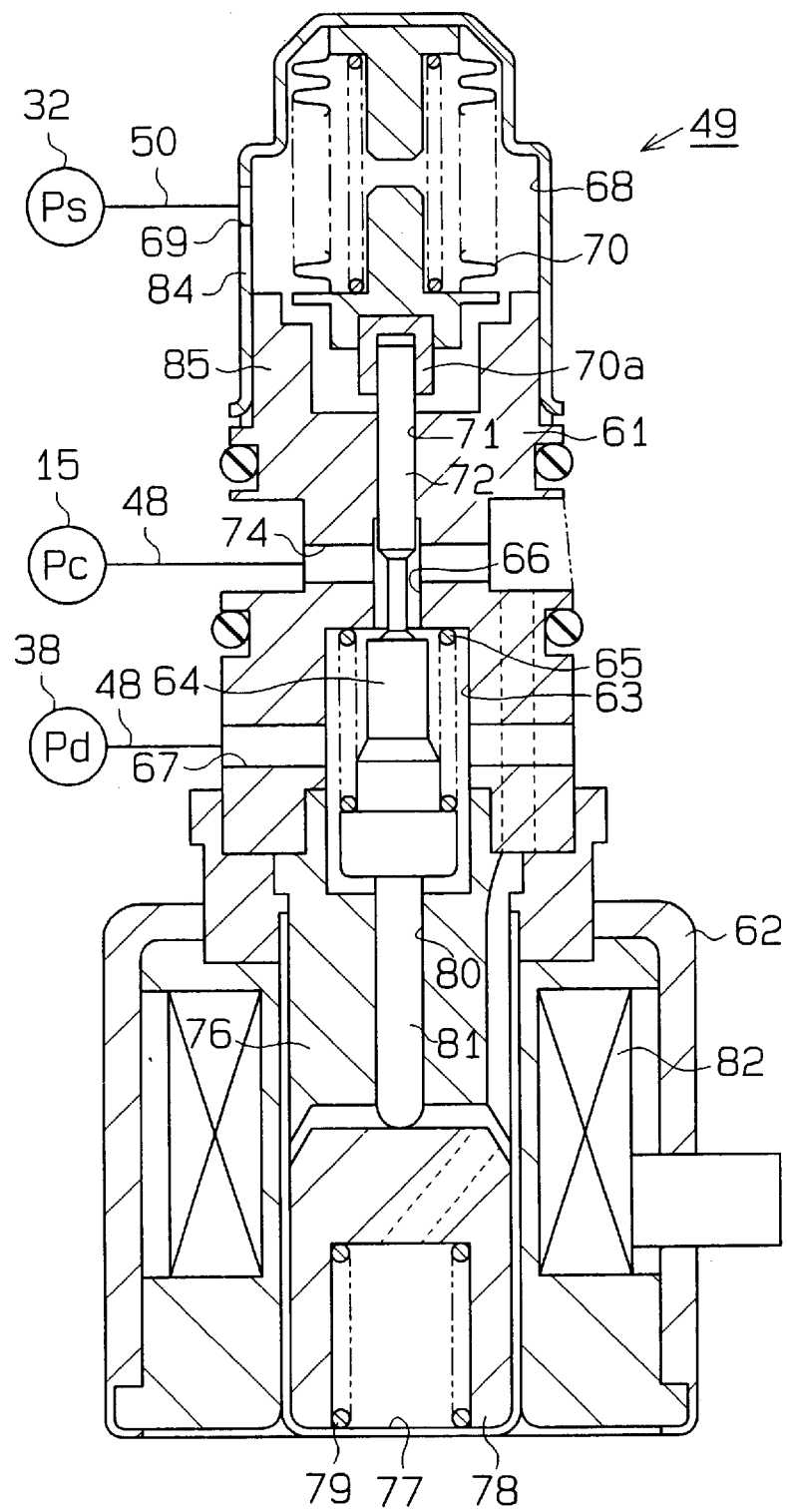
FIG. 1 is a cross-sectional view illustrating a control valve according to a first embodiment of the present invention.

As shown in FIG. 1, the control valve 49 includes a housing 61 and the solenoid 62, which are secured to each other. The housing 61 and the solenoid 62 define a valve chamber 63 in between. The valve chamber 63 is connected to the discharge chamber 38 by a first port 67 and the supply passage 48 and accommodates a valve body 64. The housing 61 also includes a valve hole 66, which is defined extending axially in the housing 61 and opens to the valve chamber 63. The opening of the valve hole 66 faces the valve body 64. A first coil spring 65 extends between the valve body 64 and a wall of the valve chamber 63 for urging the valve body 64 in a direction to open the valve hole 66.

A cap 84 is secured to the upper end of the housing 61. The cap 54 and the housing 61 define a pressure sensing chamber 68 in between. The pressure sensing chamber 68 accommodates a bellows 70 including a spring and is connected to the suction passage 32 by a second port 69 and the pressure introduction passage 50. The second port 69 and the passage 50 thus communicates suction pressure Ps in the suction passage 32 to the chamber 68. The pressure Ps is detected by the bellows 70, which functions as a pressure reacting member. A first guide hole 71 is defined in the housing 61 between the pressure sensing chamber 68 and the valve hole 66. The axis of the first guide hole 71 is aligned with the axis of the valve hole 66. The bellows 70 is operably coupled to the valve body 64 by a first rod 72 that is integrally formed with the valve body 64. The first rod 72 extends through and slides with respect to the first guide hole 71. The upper end of the first rod 72 is slidably inserted in a receiver 70a provided on the lower end of the bellows 70. The first rod 72 has a small diameter portion, which extends within the valve hole 66. The clearance between the small diameter portion and the valve hole 66 permits the flow of refrigerant gas.

A third port 74 is defined in the housing 61 between the valve chamber 63 and the pressure sensing chamber 68. The port 74 extends perpendicularly with respect to the valve hole 66. The valve hole 66 is connected to the crank chamber 15 by the third port 74 and the supply passage 48.

The solenoid 62 includes a plunger chamber 77 defined therein and a fixed steel core 76 press fitted in the upper opening of the plunger chamber 77. The plunger chamber 77 accommodates a cylindrical steel plunger 78 having a closed end. The plunger 78 slides with respect to the chamber 77. A second coil spring 79 extends between the plunger 78 and the bottom of the plunger chamber 77. The urging force of the second coil spring 79 is smaller than that of the first coil spring 65.

The fixed core 76 includes a second guide hole 80 extending between the plunger 77 and the valve chamber 63. The second guide hole 80 accommodates a second rod 81, which is formed integrally with the valve body 64 and projects downward therefrom. The second rod 81 slides with respect to the second guide hole 80. The first spring 65 urges the valve body 64 downward, while the second spring 79 urges the plunger 78 upward. This causes the lower end of the second rod 81 to maintain contact with the plunger 78. In other words, the valve body 64 moves integrally with the plunger 78 with the second rod 81 in between.

The solenoid 62 includes a cylindrical coil 82, which is wound about the fixed core 76 and the plunger 7B. The driving circuit 60 provides the coil 82 with electric current based on commands from the computer 57. The computer 57 determines the magnitude of the current.

The housing 61 includes an upper cylindrical portion 85. The cap 84 has a cylindrical shape with a closed upper end and is fitted to the circumference of the cylindrical portion 85. The bellows 70 is accommodated in the cap 84. The axially initial position of the bellows 70 in relation to the housing 61 is determined by adjusting the axial position of the cap 84 in relation to the cylindrical portion 85. After determining the initial position of the bellows 70, the cap 84 is fixed to the cylindrical portion 85 by crimping. The cylindrical portion 85 and the cap 84 define the pressure sensing chamber 68 therebetween.

The assembly of the cap 84 and the cylindrical portion 85 of the housing 61 will now be described.

Firstly, the bellows 70 is placed in the cap 84. Then, the cap 84 is fitted about the circumference of the cylindrical portion 85 with the upper end of the first rod 82 inserted into the receiver 70a located at the lower end of the bellows 70.

Thereafter, a current having a predetermined magnitude is supplied to the coil 82 of the solenoid 62 for generating electromagnetic attractive force between the fixed core 76 and the plunger 78. The attractive force, the magnitude of which corresponds to the magnitude of the supplied current, acts on the valve body 64 through the second rod 81 and moves the valve body 64 in a direction to close the valve hole 66. At the same time, a predetermined pressure is communicated to the pressure sensing chamber 68 is through the second port 69. The bellows 70 is deformed, or is expanded or collapsed, in accordance with the pressure in the chamber 68.

In this state, the axial position of the cap 84 in relation to the cylindrical portion 85 is adjusted to a position at which the force of the bellows 70 starts acting on the valve body 64 through the first rod 72 (that is, a position at which the receiver 70a of the bellows 70 starts pushing the first rod 72). In this manner, the axial position of the cap 84 is determined with respect to the cylindrical portion 85. Accordingly, the initial position of the bellows 70 in relation to the housing 61 is determined. The cap 84 and the cylindrical portion 85 are crimped by a jig (not shown) for fixing the position of the cap 84 in relation to the cylindrical portion 85. The bellows 70 is thus held at the determined initial position.

As described above, the initial position of the bellows 70 in relation to the housing 61 is changed by altering the position of the cap 84 in relation to the cylindrical portion 85. Changes in the initial position of the bellows 70 vary the responsiveness of the valve body 64 to the pressure in the pressure sensing chamber 68 (the suction pressure Ps). Overlapping the cap 84 on the cylindrical portion 85 by a greater amount brings the bellows 70 closer to the housing 61. Contrarily, overlapping the cap 84 on the cylindrical portion 85 by a smaller amount increases the distance between the bellows 70 and the housing 61. A decreasing pressure in the chamber 68 expands the bellows 70, thereby increasing the force that pushes the valve body 64 in a direction to open the valve hole 66. Therefore, if the force of the solenoid 62 acting on the valve body 64 is constant, the smaller the distance between the bellows 70 and the housing 61 is, the wider the opening between the hole 66 and the valve body 64 becomes.

The operation of the above described compressor will now be described.

When the air conditioner starting switch 59 is on, if the temperature detected by the compartment temperature sensor 58a is higher than a target temperature set by the temperature adjuster 58, the computer 57 commands the driving circuit 60 to excite the solenoid 62. Accordingly, electric current having a certain magnitude is sent to the coil 86 from the driving circuit 60. This produces a magnetic attractive force between the fixed core 76 and the plunger 78, as illustrated in FIGS. 2 and 3, in accordance with the current magnitude. The attractive force is transmitted to the valve body 64 by the second rod 81 and thus urges the valve body 64 against the force of the first spring 65 in a direction closing the valve hole 66. On the other hand, the length of the bellows 70 varies in accordance with the suction pressure Ps in the suction passage 32 that is introduced to the pressure sensing chamber 68 via the pressure introduction passage 50. The changes in the length or the bellows 70 are transmitted to the valve body 64 by the first rod 72. The higher the suction pressure Ps is, the shorter the bellows 70 becomes. As the bellows 70 becomes shorter, the bellows 70 moves the valve body 64 in a direction closing the valve hole 66.

The opening area between the valve body 64 and the valve hole 66 is determined by the equilibrium the forces acting on the valve body 64. Specifically, the opening area is determined by the equilibrium position of the body 64, which is affected by the force of the solenoid 62 (including the force of the second spring 79), the force of the bellows 70 and the force of the first spring 65.

Suppose the cooling load is great, the suction pressure Ps is high and the temperature in the vehicle compartment detected by the sensor 58a is higher than a target temperature set by the temperature adjuster 58. The computer 57 commands the driving circuit 60 to increase the magnitude of the current sent to the coil 86 as the difference between the compartment temperature and the target temperature increases. This increases the attractive force between the fixed core 76 and the plunger 78, thereby increasing the resultant force that causes the valve body 64 to close the valve hole 66. Accordingly, the pressure Ps required for moving the valve body 64 in a direction closing the valve hole 66 is lowered. In this state, the valve body 64 changes the opening of the valve hole 66 in accordance with relatively low suction pressure Ps. In other words, as the magnitude of the current to the control valve 49 is increased, the valve 49 functions to maintain the pressure Ps (the target suction pressure) at a lower level.

A smaller opening area between the valve body 64 and the valve hole 66 decreases the amount of refrigerant gas flow from the discharge chamber 38 to the crank chamber 15 via the supply passage 48. The refrigerant gas in the crank chamber 15 flows into the suction chamber 37 via the pressure release passage 46 and the pressure release hole 47. This lowers the pressure Pc in the crank chamber 15. Further, when the cooling load is great, the suction pressure Ps is high. Accordingly, the pressure in each cylinder bore 11a is high. Therefore, the difference between the pressure Pc in the crank chamber 15 and the pressure in each cylinder bore 11a is small. This increases the inclination of the swash plate 22, thereby causing the compressor to operate at a large displacement.

When the valve hole 66 in the control valve 49 is completely closed by the valve body 64, the supply passage 48 is closed. This stops the supply of the highly pressurized refrigerant gas in the discharge chamber 38 to the crank chamber 15. Therefore, the pressure Pc in the crank chamber 15 becomes substantially equal to the low pressure Ps in the suction chamber 37. The inclination of the swash plate 22 thus becomes maximum as shown in FIGS. 2 and 3, and the compressor operates at the maximum displacement. The abutment of the swash plate 22 against the projection 21a of the rotor 21 prevents the swash plate 22 from inclining beyond the predetermined maximum inclination.

Suppose the cooling load is small, the suction pressure Ps is low and the difference between the compartment temperature detected by the sensor 58a and a target temperature set by the temperature adjuster 58 is small. The computer 57 commando the driving circuit 60 to decrease the magnitude of the current sent to the coil 87 as the difference between the compartment temperature and the target temperature becomes smaller. This decreases the attractive force between the fixed core 76 and the plunger 78, thereby decreasing the resultant force that moves the valve body 64 in a direction closing the valve hole 66. This raises the pressure Ps required for moving the valve body 64 in a direction to close the valve hole 66. In this state, the valve body 64 changes the opening of the valve hole 66 in accordance with relatively high suction pressure Ps. In other words, as the magnitude of the current to the control valve 49 is decreased, the valve 49 functions to maintain the pressure Ps (target suction pressure) at a higher level.

A larger opening area between the valve body 64 and the valve hole 66 increases the amount of refrigerant gas flow from the discharge chamber 38 to the crank chamber 15. This increases the pressure Pc in the crank chamber 15. Further, when the cooling load is small, the suction pressure Ps is low and the pressure in the cylinder bores 11a is low. Therefore, the difference between the pressure Pc in the crank chamber 15 and the pressure in the cylinder bores 11a is great. This decreases the inclination of the awash plate 22. The compressor thus operates at a small displacement.

As the cooling load approaches zero, the temperature of the evaporator 55 in the external refrigerant circuit 52 drops to a frost forming temperature. When the temperature sensor 56 detects a temperature that is equal to or lower than the frost forming temperature, the computer 57 commands the driving circuit 60 to de-excite the solenoid 62. The driving circuit 60 stops sending current to the coil 82, accordingly. This stops the magnetic attractive force between the fixed core 76 and the plunger 78. The valve body 64 is then moved by the force of the first spring 65 against the weaker force of the second spring 81 transmitted by the plunger 78 and the second rod 81 as illustrated in FIG. 4. In other words, the valve body 64 is moved in a direction to open the valve hole 66. This maximizes the opening area between the valve body 64 and the valve hole 66. Accordingly, gas flow from the discharge chamber 38 to the crank chamber 15 is increased. This further raises the pressure Pc in the crank chamber 15, thereby minimizing the inclination of the swash plate 22. The compressor thus operates at the minimum displacement.

When the switch 59 is turned off, the computer 57 commands the driving circuit 60 to de-excite the solenoid 62. Accordingly, the inclination of the awash plate 22 is minimized.

As described above, when the magnitude of the current to the coil 82 is increased, the valve body 64 functions such that the opening of the valve hole 66 is closed by a lower suction pressure Ps. When the magnitude of the current to the coil 82 is decreased, on the other hand the valve body 64 functions such that the opening of the valve hole 66 is closed by a higher suction pressure Ps. The compressor changes the inclination of the swash plate 22 to adjust its displacement thereby maintaining the suction pressure Ps at a target value. Accordingly, the functions of the control valve 49 include changing the target value of the suction pressure Ps in accordance with the magnitude of the supplied current and allowing the compressor to operate at the minimum displacement at any given suction pressure Ps by maximizing the opening area of the valve hole 66. A compressor equipped with the control valve 49 having such functions varies the cooling ability of the air conditioner.

When the inclination of the swash plate 22 is minimum as illustrated in FIG. 4, the shutter 28 abuts against the positioning surface 33. This prevents the inclination of the swash plate 22 from being less than the predetermined minimum inclination. The abutment also disconnects the suction passage 32 from the suction chamber 37. This stops gas flow from the external refrigerant circuit 52 to the suction chamber 37, thereby stopping the circulation of refrigerant gas between the circuit 52 and the compressor.

The minimum inclination of the swash plate 22 is slightly larger than zero degrees. Zero degrees refers to the angle of the swash plate's inclination when it is perpendicular to the axis of the drive shaft 16. Therefore, even if the inclination of the swash plate 22 is minimum, refrigerant gas in the cylinder bores 11a is discharged to the discharge chamber 38 and the compressor operates at the minimum displacement. The refrigerant gas discharged to the discharge chamber 38 from the cylinder bores 11a enters the crank chamber 15 through the supply passage 48. The refrigerant gas in the crank chamber 15 is drawn back into the cylinder bores 11a through the pressure release passage 46, the pressure release hole 47 and the suction chamber 37. That is, when the inclination of the swash plate 22 is minimum, refrigerant gas circulates within the compressor traveling through the discharge chamber 38, the supply passage 48, the crank chamber 15, the pressure release passage 46, the pressure release hole 47, the suction chamber 37 and the cylinder bores 11a. This circulation of refrigerant gas allows lubricant oil contained in the gas to lubricate the moving parts of the compressor.

If the switch 59 is on and the inclination of the swash plate 22 is minimum, an increase in the compartment temperature increases the cooling load. In this case, the temperature detected by the compartment temperature sensor 58a is higher than a target temperature set by the compartment temperature adjuster 58. The computer 57 commands the driving circuit 60 to excite the solenoid 62 based on the detected temperature increase. When the solenoid 62 is excited, the supply passage 48 is closed. This stops the flow of refrigerant gas from the discharge chamber 38 into the crank chamber 15. The refrigerant gas in the crank chamber 15 flows into the suction chamber 37 via the pressure release passage 46 and the pressure release hole 47. This gradually lowers the pressure Pc in the crank chamber 15, thereby moving the swash plate 22 from the minimum inclination to the maximum inclination.

As the inclination of the swash plate 22 increases, the force of the spring 29 gradually pushes the shutter 28 away from the positioning surface 33. This gradually enlarges the cross-sectional area of the passage between the suction passage 32 and the suction chamber 37. Accordingly, the amount of refrigerant gas flow from the suction passage 32 into the suction chamber 37 gradually increases. Therefore, the amount of refrigerant gas that enters the cylinder bores 11a from the suction chamber 37 gradually increases. The displacement of the compressor gradually increases, accordingly. The discharge pressure Pd of the compressor gradually increases and the torque for operating the compressor also gradually increases. In this manner, the torque of the compressor does not dramatically change in a short time when the displacement changes from the minimum to the maximum. This reduces the shock that accompanies load torque fluctuations.

If the engine E is stopped, the compressor is also stopped, that is, the rotation of the swash plate 22 is stopped, and the supply of current to the coil 82 in the control valve 49 is stopped. This de-excites the solenoid 62, thereby opening the supply passage 48. In this state, the inclination of the swash plate 22 is minimum. If the nonoperational state of the compressor continues, the pressures in the chambers of the compressor become equalized and the swash plate 22 is kept at the minimum inclination by the force of spring 26. Therefore, when the engine E is started again, the compressor starts operating with the swash plate 22 at the minimum inclination. This requires the minimum torque. The shock caused by starting the compressor is thus reduced.

The first embodiment has the following advantages.

In this embodiment, the cap 84 having the bellows 70 is assembled to the cylindrical portion 85 of the housing 61. At this time, the axial position of the cap 84 in relation to the cylindrical portion 85 is adjusted for determining the initial position of the bellows 70 in relation to the housing 61. Then, the cap 84 is secured to the cylindrical portion 85 by crimping. The bellows 70 is thus held at the determined initial position.

The above construction requires no threads to adjust the position of the bellows 70. That is, the cylindrical portion 85 and the cap 84 have simple cylindrical shapes. This facilitates forming and assembly of the cylindrical portion 85 and the cap 84 thereby lowering the cost. Further, compared to a threaded cap, the construction of the first embodiment easily and accurately determines the initial position or the bellows 70.

The cap 84 is fixed to the cylindrical portion 85 by crimping, which is relatively simple and positively prevents the position of the cap 84 in relation to the cylindrical portion 85 from changing. Therefore, the bellows 70 is positively maintained at the initial position under any conditions.

A second embodiment of the present invention will now be described with reference to FIGS. 5 and 6. The differences from the first embodiment will mainly be discussed below, and like or the same reference numerals are given to those components that are like or the same as the corresponding components of the first embodiment.

Figure 5:
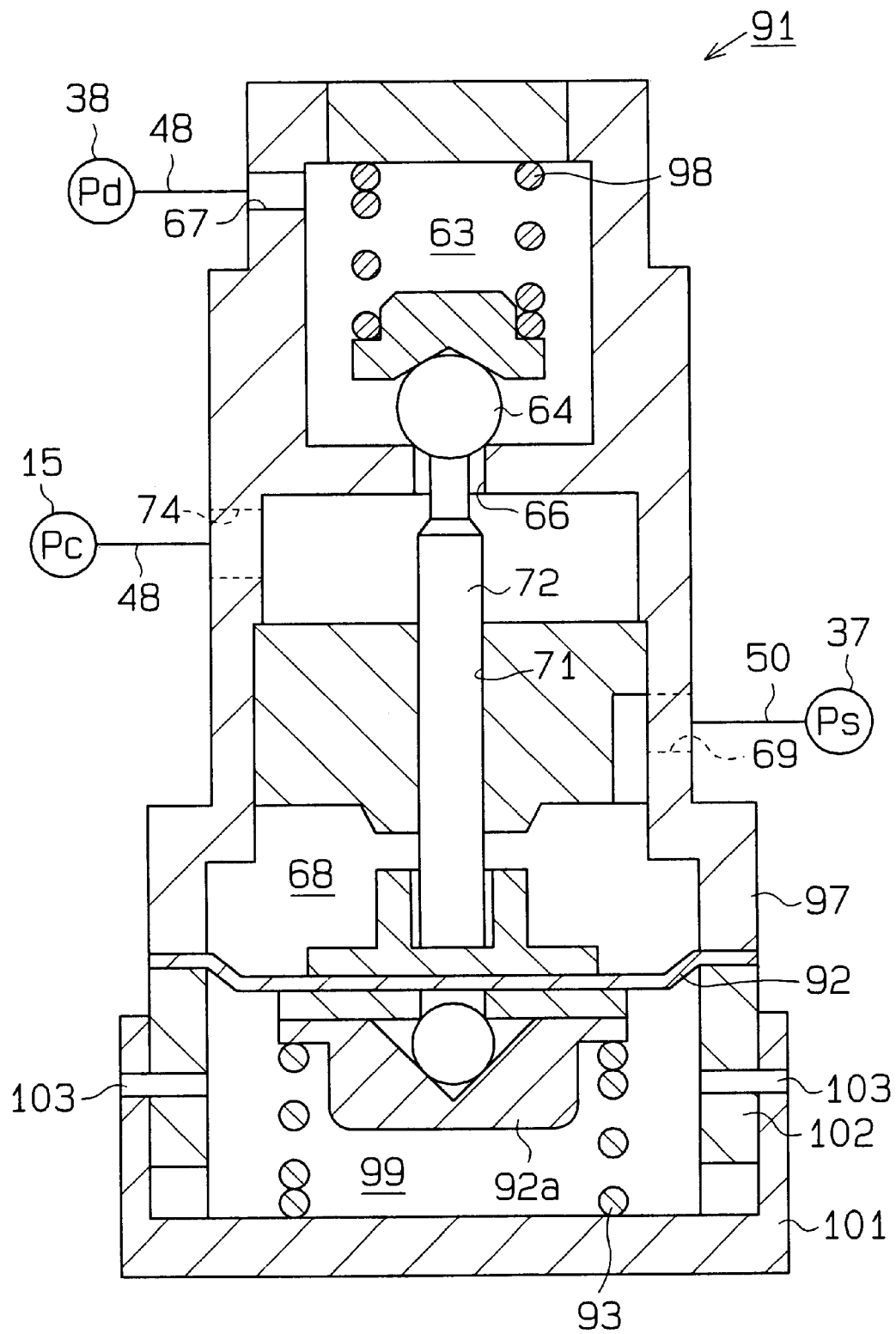
FIG. 5 is a cross-sectional view illustrating a control valve according to a second embodiment of the present invention.

As illustrated in FIG. 5, a displacement control valve 91 according to this embodiment does not have a solenoid. A valve body 64 of the control valve 91 is moved only by suction pressure Ps. Instead of a bellows, the control valve 91 includes a diaphragm 92 and a spring 93 that function as a pressure reacting member.

Figure 6:
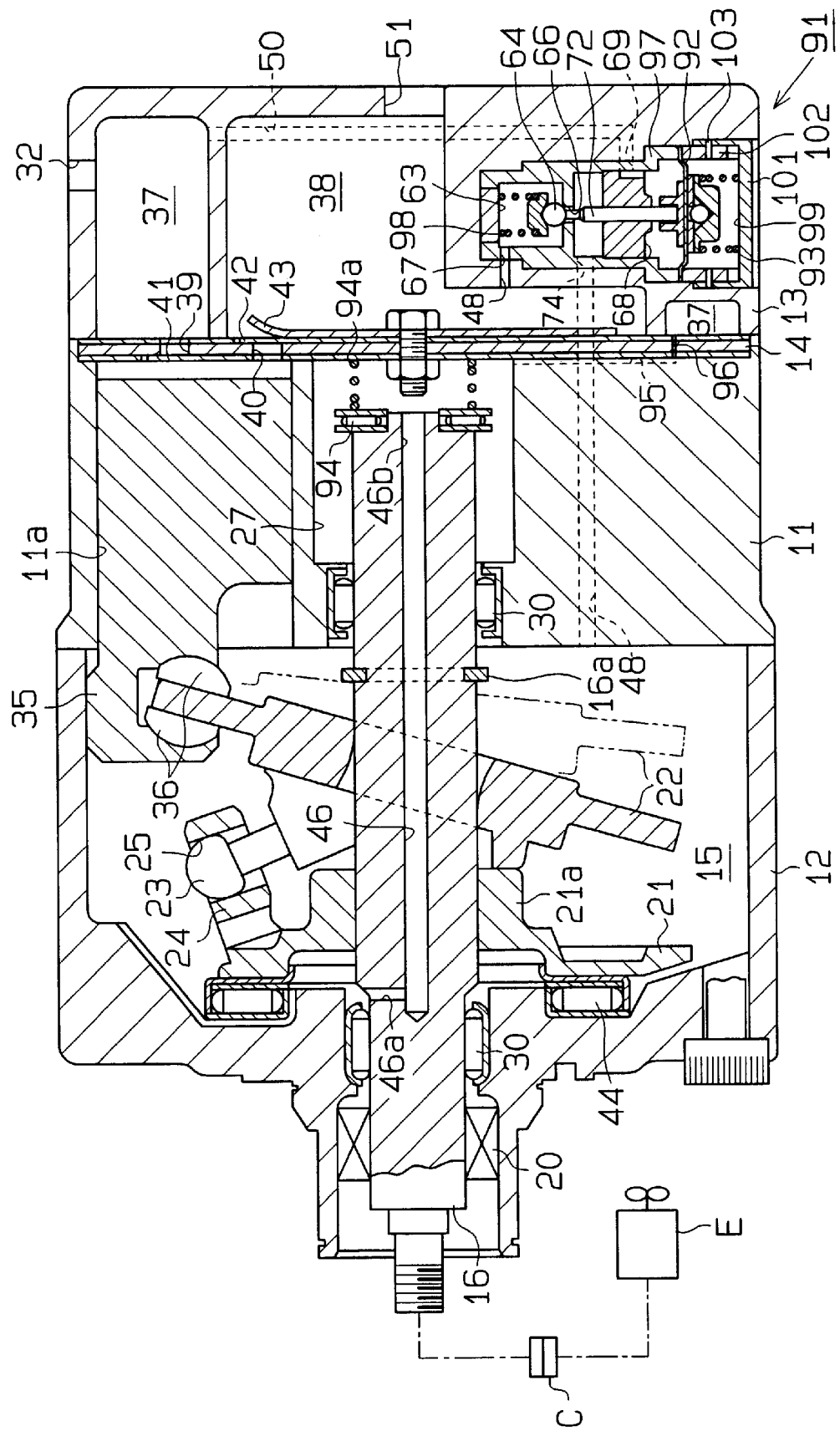
FIG. 6 is a cross-sectional view illustrating a variable displacement compressor including the control valve of FIG. 5.

As illustrated in FIG. 6, a variable displacement compressor incorporating the control valve 91 has no shutter mechanism to open and close the suction passage 32. The compressor has a drive shaft 16 that is coupled to an external drive source (a vehicle engine E) by a clutch C. The drive shaft 16 is supported by sets of radial bearings 30 in the front housing 12 and the cylinder block 11, respectively. A thrust bearing 94 and a coil spring 94a are located between the rear end of the drive shaft 16 and a valve seat 14. The drive shaft 16 has a snap ring 16a, which defines the minimum inclination of the swash plate 22. The drive shaft 16 includes a pressure release passage 46. The cylinder block 11 includes a hole 27 defined therein. A groove 95 is formed in the rear end face of the cylinder block 11 and a communication hole 96 is formed in the valve plate 14. The pressure release passage 46 is communicated with the suction chamber 37 by the hole 27, the groove 95 and the hole 96. The hole 96 functions as a restriction for controlling the flow rate of refrigerant gas.

The construction of the control valve 91 will now be described.

As illustrated in FIG. 5, the control valve 91 includes a housing 97. The housing 97 includes a valve hole 66 formed therein. The housing 97 also incorporates a valve body 64 for opening and closing the valve hole 66, and a diaphragm 92 and a spring 93 for moving the valve body 64, The valve body 64 is also urged in a direction to close the valve hole 66 by a closing spring 98. The valve body 64 is coupled to the diaphragm 92 by a rod 72.

The housing 97 includes a cylindrical portion 102 at the lower end. A cylindrical cap 101 having a closed lower end is fitted about the circumference of the cylindrical portion 102 from below. The cylindrical portion 102, the cap 101 and the diaphragm 92 define a spring chamber 99 for accommodating the spring 93. The housing 97 also includes a pressure sensing chamber 68 defined therein. The diaphragm 92 is between the chamber 68 and the spring chamber 99. As shown in FIG. 6, the pressure sensing chamber 68 is communicated with the suction chamber 37 by a second port 69 and the pressure introduction passage 50.

The spring 93 extends between the inner wall of the cap 101 and a spring seat 92a provided at the lower side of the diaphragm 92. The spring 93 urges the diaphragm in a direction to increase the opening between the valve hole 66 and the valve body 64.

The axial position of the cap 101 in relation to the cylindrical portion 102 is adjusted to determine the initial length of the spring 93 and the initial state of the diaphragm 92. The initial state of the diaphragm 92 refers to the axial position of the diaphragm's center portion, which contacts the rod 72. In other words, the initial position of the cap 101 determines the initial flexion of the diaphragm 92. After determining the initial position of the diaphragm 92, the cap 101 is fixed to the cylindrical portion 102 by pins 103.

The assembly of the cap 101 and the cylindrical portion 102 of the housing 97 will now be described.

Firstly, the cap 101 is fitted to the circumference of the cylindrical portion 102 with the spring 93 between the spring seat 92a and the cap 101. Then, a predetermined pressure is communicated with the pressure sensing chamber 68 via the second port 69. The diaphragm 92 is displaced in accordance with the pressure in the chamber 68.

In this state, the axial position of the cap 101 in relation to the cylindrical portion 102 is adjusted to a position at which the force of the diaphragm 92 starts acting on the valve body 64 through the rod 72 (that is, a position at which the diaphragm 92 starts pushing the rod 72). In this manner, the axial position of the cap 101 is determined with respect to the cylindrical portion 102. Accordingly, the initial position of the diaphragm 92 is set. The pins 103 are then driven through the cap 101 and the cylindrical portion 102. This fixes the cap 101 to the cylindrical portion 102 thereby holding the diaphragm 92 at the determined initial position.

As described above, the initial position of the diaphragm 92 is changed by altering the position of the cap 101 in relation to the cylindrical portion 102. Changes in the initial position of the diaphragm 92 vary the responsiveness of the valve body 64 to the pressure in the pressure sensing chamber 68 (the suction pressure Ps). Overlapping the cap 101 on the cylindrical portion 102 by a greater amount shortens the initial length of the spring 93 thereby increasing the urging force of the spring 93 that acts on the diaphragm 92. This increases the flexion of the diaphragm 92 toward the rod 72. Contrarily, overlapping the cap 101 on the cylindrical portion 102 by a smaller amount elongates the initial length of the spring 93 thereby decreasing the urging force of the spring 93 that acts on the diaphragm 92. This decreases the flexion of the diaphragm 92 toward the rod 72. A lower pressure in the chamber 68 flexes the diaphragm 92 toward the rod 72, thereby increasing the diaphragm's force that pushes the valve body 64 in a direction to open the valve hole 66. Therefore, overlapping the cap 101 on the cylindrical portion 102 by a greater amount increases the opening amount between the valve hole 66 and the valve body 64.

The operation of a compressor having the control valve 91 will now be described.

The diaphragm 92 displaces the valve body 64 in accordance with the suction pressure Ps, which is introduced in the pressure sensing chamber 68 from the suction chamber 37 through the introduction 50 and the second port 69. In other words, the diaphragm 92 controls the opening between the valve body 64 and the valve hole 66. Controlling the opening amount of the valve hole 66 adjusts the amount of refrigerant gas supplied to the crank chamber 15 from the discharge chamber 38. This changes the difference between the pressures acting on the front and rear sides of the pistons 35, or the difference between the pressure Pc in the crank chamber 15 and the pressure in the cylinder bores 11a. As a result, the inclination of the swash plate 22, or the stroke of the pistons 35, is changed. Accordingly, the displacement of the compressor is varied.

If the compartment temperature is high and the cooling load is great, the pressure Ps in the suction chamber 37 is high. The high suction pressure Ps is communicated with the pressure sensing chamber 68 in the control valve 91 by the introduction passage 50, and displaces the diaphragm 92 toward the spring chamber 99. This allows the valve body 64 to be moved by the force of the spring 98 in a direction to decrease the opening of the valve hole 66. The opening of the supply passage 48 is decreased accordingly. As a result, the amount or refrigerant gas supplied to the crank chamber 15 from the discharge chamber 38 is decreased. The refrigerant gas in the crank chamber 15 flows into the suction chamber 37 via the pressure release passage 46, the hole 27, the groove 95 and the hole 96. This lowers the pressure Pc in the crank chamber 15. Since the suction pressure Ps is high, the pressure in each cylinder bore 11a is also high. Therefore, the difference between the pressure Pc in the crank chamber 15 and the pressure in each cylinder bore 11a is small. This increases the inclination of the awash plate 22, thereby causing the compressor to operate at a large displacement.

A further increase in the compartment temperature increases the cooling load. Accordingly, the pressure Ps in the suction chamber 38 is increased and the valve body 64 closes the valve hole 66. This stops the flow of highly pressurized refrigerant gas from the discharge chamber 38 to the crank chamber 15 thereby equalizing the pressure Pc in the crank chamber 15 with the pressure Ps in the suction chamber 37. As a result, the swash plate 22 is moved to the maximum inclination position, as shown by the solid lines in FIG. 6. The compressor therefore operates at the maximum displacement.

If the compartment temperature is low and the cooling load is low, the pressure Ps in the suction chamber 37 is low. The low suction pressure Ps in the pressure sensing chamber 68 displaces the diaphragm 92 toward the chamber 68. Accordingly, the diaphragm 92 moves the valve body 64 to increase the opening of the valve hole 66. This increases the amount of refrigerant gas supplied form the discharge chamber 38 to the crank chamber 15 thereby increasing the pressure Pc in the crank chamber 15. As a result, the inclination of the swash plate 22 is decreased and the compressor operates at a small displacement.

If the compartment temperature is further lowered and the cooling load approaches zero, the pressure Ps in the suction chamber 37 is also further lowered. Eventually, the opening of the valve hole 66 is maximized. This further raises the pressure Pc in the crank chamber 15, thereby minimizing the inclination of the swash plate 22, as shown by the two-dot chain line in FIG. 6. The compressor thus operates at the minimum displacement.

As described above, the second embodiment has substantially the same advantages as the first embodiment. Further, having no solenoid, the control valve 91 according to the second embodiment has a simpler construction than the control valve 49 of the first embodiment.

A third embodiment of the present invention will now be described with reference to FIGS. 7 and 8. The differences from the first and second embodiments will mainly be discussed below, and like or the same reference numerals are given to those components that are like or the same as the corresponding components of the first and second embodiments.

Figure 7:
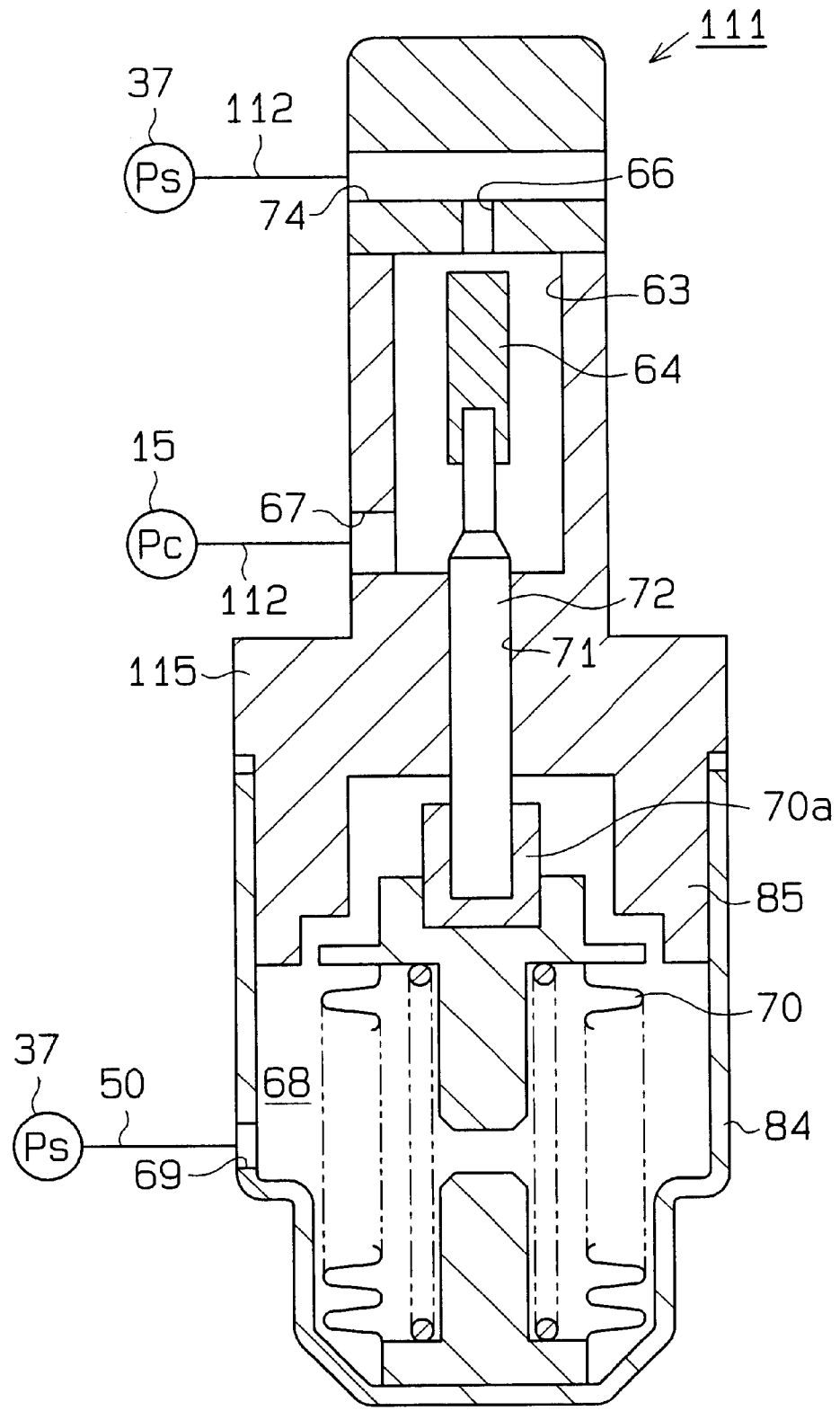
FIG. 7 is a cross-sectional view illustrating a control valve according to a third embodiment of the present invention.

FIG. 7 illustrates a displacement control valve 111 according to the third embodiment. As the control valve 91 of the second embodiment, the control valve 111 does not have solenoid and has a valve body 64 that is moved only by the suction pressure Ps. Also, the control valve 111 includes a bellows 70, which functions as a pressure reacting member.

Figure 8:
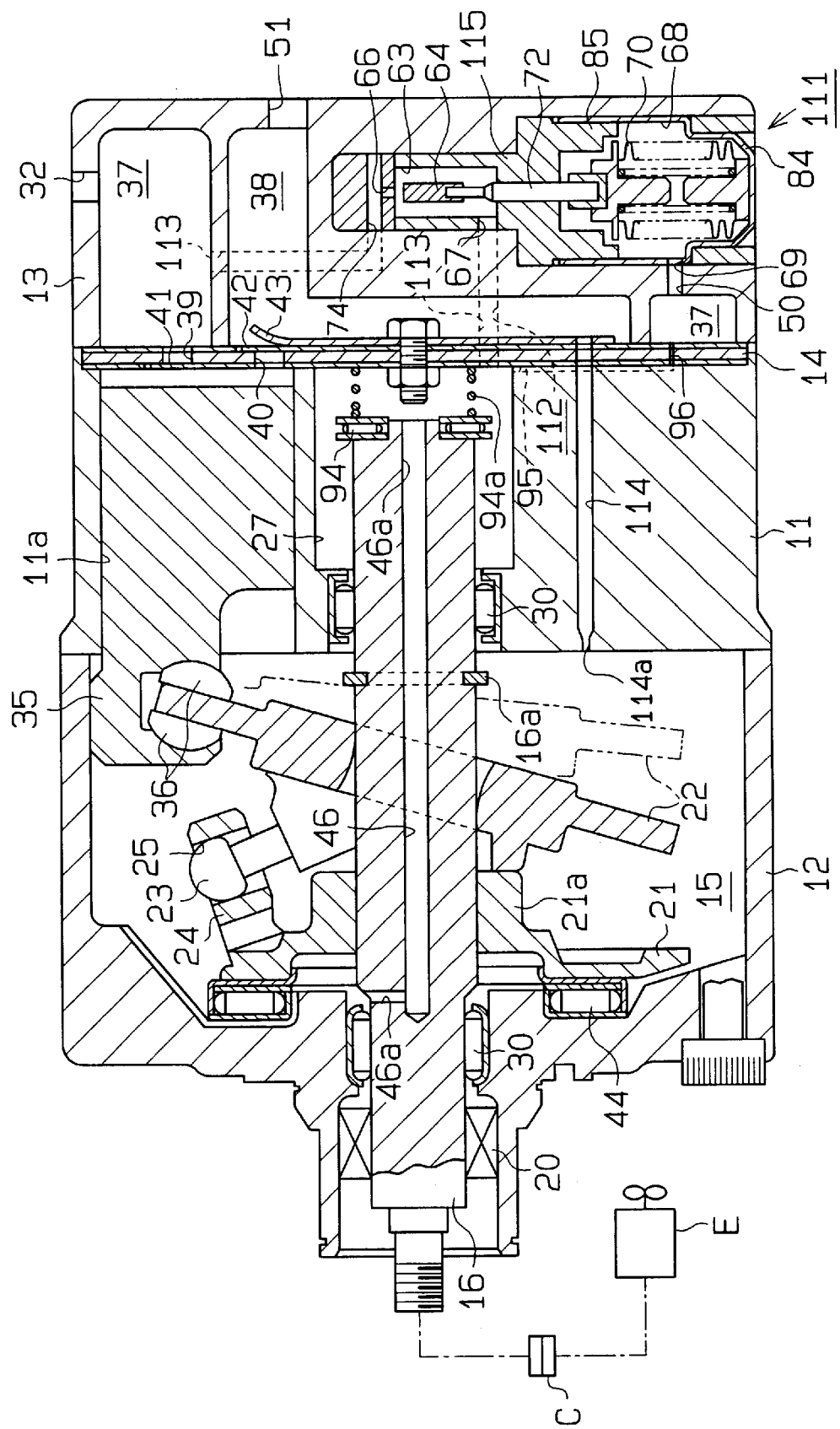
FIG. 8 is a cross-sectional view illustrating a variable displacement compressor including the control valve of FIG. 7.
Figure 9:
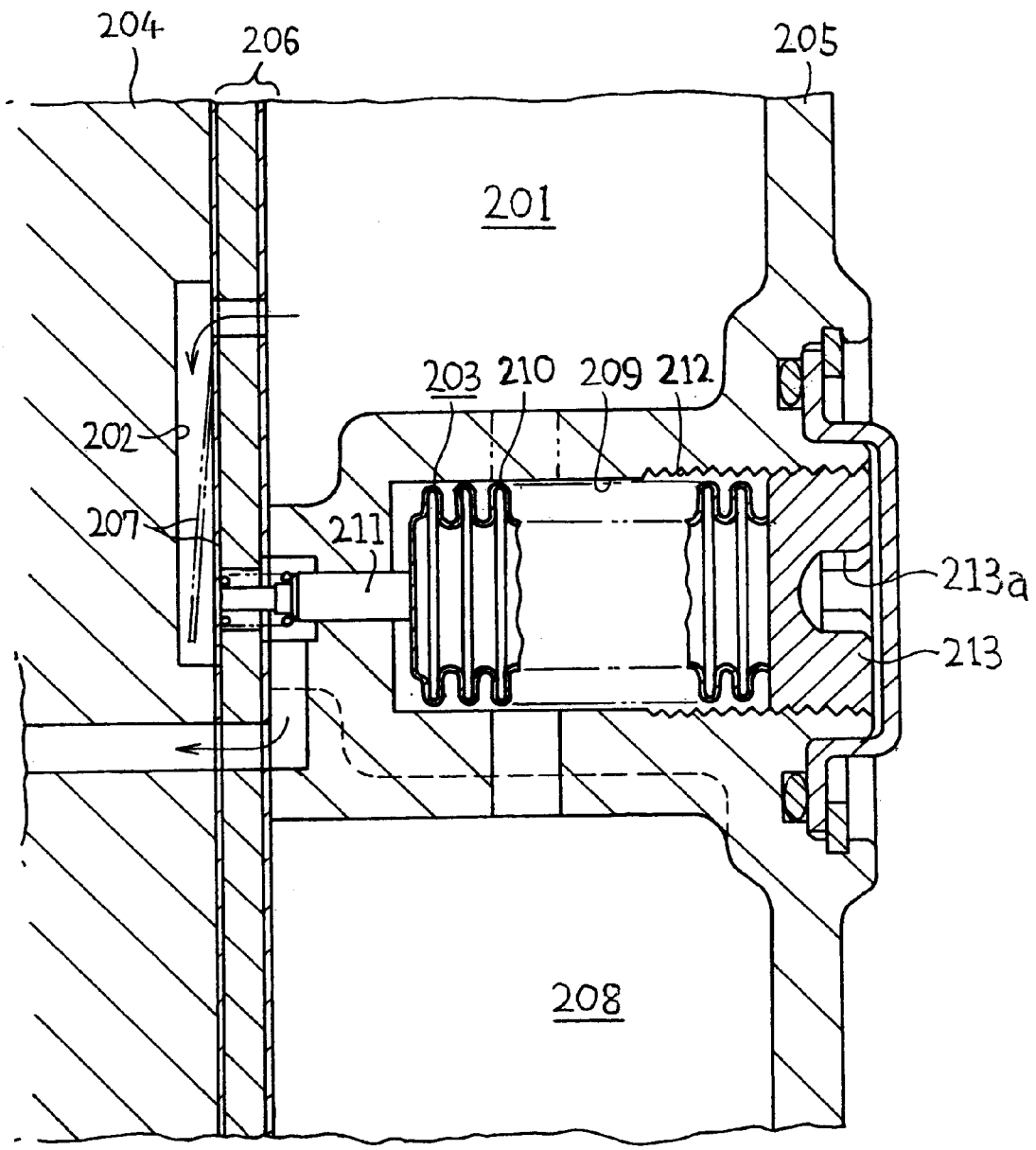
FIG. 9 is an enlarged partial cross-sectional view illustrating a prior art control valve.

As illustrated in FIG. 8, the variable displacement compressor according to the third embodiment has substantially the same construction as the compressor according to the second embodiment. However, the compressor of this embodiment includes a bleeding passage 112 that communicates the crank chamber 15 with the suction chamber 37. The displacement control valve 111 is located in the bleeding passage 112. The bleeding passage 112 includes the pressure release passage 46 defined in the drive shaft 16, the hole 27 defined in the cylinder block 11 and a passage 113 defined in the valve plate 14 and the rear housing 13. The valve 111 is located midway in the passage 113. The discharge chamber 38 is constantly communicated with the crank chamber 15 by a supply passage 114. The supply passage 114 includes a restriction 114a.

As illustrated in FIGS. 7 and 8, the control valve 111 includes a housing 115. A cylindrical portion 85 is formed in the lower portion of the housing 115. A cylindrical cap 84 having a closed lower end is fitted to the cylindrical portion 85 from below. The cylindrical portion 85 and the cap 84 define a pressure sensing chamber 68 for accommodating a bellows 70. The constructions of the cylindrical portion 85, the cap 84 and the bellows 70 are substantially the same as those of the first embodiment.

The housing 115 has a valve chamber 63 defined therein. The valve chamber 63 accommodates a valve body 64. The valve body 64 is coupled to the bellows 70 by a rod 72 to integrally move with the bellows 70. The housing 115 also includes a valve hole 66, and first to third ports 67, 69 and 74. The valve hole 66 communicates with the suction chamber 37 via the third port 74 and the downstream portion of the passage 113. The valve chamber 63 communicates with the crank chamber 15 via the first port 67, the upstream portion of the passage 113, the hole 27 and the pressure release passage 46. The pressure sensing chamber 68 communicates with the suction chamber 37 via the second port 69 and the introduction passage 50.

The assembly of the cap 84 and the cylindrical portion 85 of the housing 115 will now be described.

As in the first embodiment, the bellows 70 is accommodated in the cap 84. At this time, the bellows 70 is preferably fixed to the inner wall of the cap 84. Then, the cap 84 is fitted about the circumference of the cylindrical portion 85 with the lower end of the rod 72 inserted in the receiver 70a located at the upper end of the bellows 70. The rod 72 is fixed to the receiver 70a to integrally move with the receiver 70a. Accordingly, the valve body 64 moves integrally with the bellows 70.

A predetermined pressure is communicated to the pressure sensing chamber 68 through the second port 69. The bellows 70 is collapsed or expanded in accordance with the pressure in the chamber 68.

The cap 84 is fitted about the cylindrical portion 85 by such an amount that the valve body 64, which is coupled to the bellows 70 by the rod 72, completely closes the valve hole 66. Then, the cap 84 is gradually displaced from the cylindrical portion 85 to a position at which the valve body 64 starts separating from the valve hole 66. In this manner, the initial position of the bellows 70 is determined. In this state, the cap 84 and the cylindrical portion 85 are crimped by a jig (not shown) for fixing the position of the cap 84 in relation to the cylindrical portion 85. This allows the bellows 70 to be held at the determined initial position.

The operation of a compressor having the control valve 111 will now be described.

Refrigerant gas in the discharge chamber 38 is constantly supplied to the crank chamber 15 by the supply passage 114 having the restriction 114a. On the other hand, the bellows 70 is expanded or collapsed in accordance with the suction pressure Ps in the suction chamber 37, which is communicated with the pressure sensing chamber 68 by the introduction passage 50 and the second port 69. The bellows 70 then causes the valve body 64 to change the opening of the valve hole 66. Accordingly, the amount of refrigerant gas that is released to the suction chamber 37 from the crank chamber 15 through the bleeding passage 112 is changed. This adjusts the pressure Pc in the crank chamber 15 thereby changing the inclination of the swash plate 22. In this manner, the displacement of the compressor is varied.

For example, if the cooling load is great and the pressure Ps in the suction pressure 37 is high, the high pressure Ps in the pressure sensing chamber 68 contracts the bellows 70. The bellows 70 moves the valve body 64 in a direction to increase the opening of the valve hole 66. The opening of the bleeding passage 112 is increased, accordingly. As a result, the amount of refrigerant gas released to the suction chamber 37 from the crank chamber 15 is increased. This lowers the pressure Pc in the crank chamber 15 thereby increasing the inclination of the swash plate 22. Thus, the compressor operates at a large displacement.

A further increase in the cooling load increases the pressure Ps in the suction chamber 38. Accordingly, the valve body 64 maximizes the opening of the valve hole 66. This further increases the amount of refrigerant gas released to the suction chamber 37 from the crank chamber 15 and lowers the pressure Pc in the crank chamber 15 to a level that is substantially equal to the pressure Ps in the suction chamber 37. As a result, the swash plate 22 is moved to the maximum inclination position, as shown by the solid lines in FIG. 8. The compressor thus operates at the maximum displacement.

Contrarily, a small cooling load lowers the pressure Ps in the suction chamber 37. The lowered pressure Ps expands the bellows 70 in the pressure sensing chamber 68, to which pressure Ps in the suction pressure 37 is communicated. Accordingly, the opening of the valve hole 66 is decreased. This reduces the amount of refrigerant gas supplied from the crank chamber 15 to the suction chamber 37 thereby increasing the pressure Pc in the crank chamber 15. As a result, the inclination of the swath plate 22 is decreased and the compressor operates at a small displacement.

If the cooling load approaches zero, the pressure Ps in the suction chamber 37 is also further lowered. Eventually, the valve body 64 closes the valve hole 66. This stops the flow of refrigerant gas from the crank chamber 15 to the suction chamber 37 thereby further increasing the pressure Pc in the crank chamber 15. Accordingly, the inclination of the swash plate 22 is minimized as shown by the two-dot chain line in FIG. 8. The compressor thus operates at the minimum displacement.

Unlike the first and second embodiments, the compressor according to the third embodiment controls the amount of refrigerant gas from the crank chamber 15 to the suction chamber 37 by the control valve 111. Accordingly, the compressor's displacement is controlled. The compressor of the third embodiment has substantially the same advantages as those in the first and second embodiments.

It should be apparent to those skilled in the art that the present invention may be embodied in many other specific forms without departing from the spirit or scope of the invention. Particularly, it should be understood that the invention may be embodied in the following forms.

In the first to third embodiments, the inner diameter of the caps 84, 101 may be slightly smaller than the outer diameter of the cylindrical portions 85, 102 of the housings 61, 97, 115, and the caps 84, 101 may be press fitted to the cylindrical portion 85, 102. This construction prevents the position of the caps 84, 101 from being displaced with respect to the cylindrical portions 85, 102 after adjusting the axial positions of the caps 84, 101 in relation to the cylindrical portions 85, 102. Therefore, the determined initial positions of the bellows 70 and the diaphragm 92 are accurately maintained until the caps 84, 101 are permanently fixed to the cylindrical portions 85, 102 by crimping or by using the pins 103. Further, this construction positively prevents gas from leaking between the caps 84, 101 and the cylindrical portions 85, 102.

In the first to third embodiments, the caps 84, 101 are fixed to the cylindrical portions 85, 102 by crimping or by using the pins 103. However, the caps may be fixed to the cylindrical portion by spot welding. Like the crimping and the pins 103, the spot welding easily and positively fixes the caps 84, 101 to the cylindrical portions 85, 102. Since the spot welding does not deform the caps 84, 101 and the cylindrical portions 85, 102 when fixing them together, the performance of the control valve is not sacrificed. As described above, the caps 84, 101 may be press fitted to the cylindrical portions 85, 102 and may be fixed to the portions 85, 102 by spot welding. The welding methods are not limited to spot welding but include various types of welding.

In the first to third embodiments, the caps 84, 101 are fitted about the circumference of the cylindrical portions 85, 102. However, the caps 84, 101 may be fitted in the inner circumference of the cylindrical portions 85, 102.

The control valve 49 according to the first embodiment may be incorporated in a variable displacement compressor in which the drive shaft 16 is coupled to the external drive source E with a clutch in between. In this case, it is preferable to disengage the clutch only when the air conditioner starting switch 59 is off and to engage the clutch only when the switch 59 is on. This allows the clutch type compressor to operate in the same manner as the clutchless type compressor illustrated in FIG. 2. Accordingly, the number of times the clutch is engaged is significantly reduced, and the riding comfort of the vehicle is therefore improved.

In control valves 49, 91, 111 according to the first to third embodiments, refrigerant gas in the crank chamber 15 may be introduced into the pressure sensing chamber 68 by the introduction passage 50 and the second port 69. Also, the bellows 70 or the diaphragm 92 may be actuated in accordance with the pressure Pc in the crank chamber 15.

In the control valve 91 according to the second embodiment, the diaphragm 92 and the spring 93 may be replaced with a bellows 70 as in the first and third embodiments.

In the control valves 49, 91 according to the first and second embodiments, the third port 74 may be connected to the discharge chamber 38 by the upstream portion of the supply passage 48 and the first port 67 may be connected to the crank chamber 15 by the downstream portion of the supply passage 48.

In the control valve 111 according to the third embodiment, the third port 74 may be connected to the crank chamber 15 by the upstream portion of the bleeding passage 112 and the first port 67 may be connected to the suction chamber 37 by the downstream portion of the bleeding passage 112.

In the first to third embodiments, the control valves 49, 91, 111 adjust the pressure in the crank chamber 15 for controlling the displacement of the compressor. However, the displacement may be controlled in different manners. For example, the amount of refrigerant gas supplied to the suction chamber 37 from the external refrigerant circuit 52 may be changed for controlling the pressure in the cylinder bores 11a for changing the displacement of the compressor.

Therefore, the present examples and embodiments are to be considered as illustrative and not restrictive and the invention is not to be limited to the details given herein, but may be modified within the scope and equivalence of the appended claims.

What is claimed is:

1. A control valve for adjusting the amount of gas flowing in a gas passage in accordance with an operating pressure applied to the control valve, the control valve comprising:
    a housing having a valve opening located in the gas passage;
    a valve body movably accommodated in the housing to adjust the size of the valve opening;
    a reacting member for reacting to the operating pressure;
    a transmitting member located between the reacting member and the valve body to transmit the reaction of the reacting member to the valve body;
    a cylindrical portion provided on the housing; and
    a cylindrical cap fitted to the cylindrical portion, wherein the reacting member is located between the cylindrical portion and the cap, and wherein the position of the reacting member is adjusted by altering the axial position of the cap in relation to the cylindrical portion, and wherein the cap is secured to the cylindrical portion with the reacting member positioned at a specific initial position.

2. The control valve according to claim 1 further comprising a solenoid for actuating the valve body, wherein the solenoid biases the valve body with a force based on a value of electric current supplied to the solenoid when the solenoid is excited by the supply of the current.

3. The control valve according to claim 1, wherein the cap is crimped to the cylindrical portion.

4. The control valve according to claim 1 further comprising a pin for securing the cap to the cylindrical portion.

5. The control valve according to claim 1, wherein the cap is welded to the cylindrical portion.

6. The control valve according to claim 1, wherein the cap is press fitted to the cylindrical portion.

7. The control valve according to claim 6, wherein the cap has an inner circumferencial surface that is fitted about an outer circumferencial surface of the cylindrical portion, wherein the inner circumferencial surface of the cap has a diameter that is slightly smaller than the diameter of the outer circumferencial surface of the cylindrical portion.

8. The control valve according to claim 1 further comprising a pressure chamber defined between the cylindrical portion and the cap, wherein the operating pressure is introduced into the pressure chamber, and wherein the reacting member includes a bellows located in the pressure chamber, wherein the bellows collapses in accordance with an increase of the pressure in the pressure chamber and is expanded in accordance with a decrease of the pressure in the pressure chamber.

9. The control valve according to claim 1 further comprising;
    a diaphragm serving as the reacting member, wherein the diaphragm is supported by the housing to define a pressure chamber in the housing, wherein the operating pressure is introduced into the pressure chamber;
    a spring chamber defined between the cap and the diaphragm, wherein the diaphragm is located between the pressure chamber and the spring chamber; and
    a spring located in the spring chamber to bias the diaphragm toward the pressure chamber.

10. A control valve in a variable displacement compressor that adjusts the discharge displacement in accordance with the inclination of a drive plate located in a crank chamber, wherein the compressor includes a piston operably coupled to the drive plate, the piston being located in a cylinder bore, wherein the piston compresses gas supplied to the cylinder bore from a suction chamber and discharges the compressed gas to a discharge chamber from the cylinder bore, wherein the inclination of the drive plate is variable according to the difference between the pressure in the crank chamber and the pressure in the cylinder bore, wherein the compressor further includes an adjusting device for adjusting the difference between the pressure in the crank chamber and the pressure in the cylinder bore, wherein the adjusting device includes the control valve and a gas passage for conducting gas, wherein the control valve regulates tho amount of the gas flowing in the gas passage, the control valve comprising:

a housing having a valve opening located in the gas passage;

a valve body movably accommodated in the housing to adjust the size of the valve opening;

a reacting member for reacting to the pressure of gas supplied to the compressor;

a transmitting member located between the reacting member and the valve body to transmit the reaction of the reacting member to the valve body;

a cylindrical portion provided on the housing; and a cylindrical cap fitted to the cylindrical portion, wherein the reacting member is located between the cylindrical portion and the cap, and wherein the position of the reacting member is adjusted by altering the axial position of the cap in relation to the cylindrical portion, and wherein the cap is secured to the cylindrical portion with the reacting member positioned at a specific initial position.

11. The control valve according to claim 10 further comprising a solenoid for actuating the valve body, wherein the solenoid biases the valve body with a force based on a value of electric current supplied to the solenoid when the solenoid is excited by the supply of the current.

12. The control valve according to claim 10, wherein the cap is crimped to the cylindrical portion.

13. The control valve according to claim 10 further comprising a pin for securing the cap to the cylindrical portion.

14. The control valve according to claim 10, wherein the cap is welded to the cylindrical portion.

15. The control valve according to claim 10, wherein the cap is press fitted to the cylindrical portion.

16. The control valve according to claim 10, wherein the gas passage is a supply passage connecting the discharge chamber to the crank chamber for supplying gas from the discharge chamber to the crank chamber, and wherein the control valve is located in the supply passage for adjusting the amount of gas supplied to the crank chamber from the discharge chamber through the supply passage to control the pressure in the crank chamber.

17. The control valve according to claim 10, wherein the gas passage is a bleeding passage connecting the crank chamber to the suction chamber for releasing gas from the crank chamber to the suction chamber, and wherein the control valve is located in the bleeding passage for adjusting the amount of gas released to the suction chamber from the crank chamber through the bleeding passage to control the pressure in the crank chamber.

18. A method for assembling a control valve that adjusts the amount of gas flowing in a gas passage in accordance with an operating pressure applied to the control valve, wherein the control valve includes a housing having a valve opening located in the gas passage, a valve body movably accommodated in the housing to adjust the size of the valve opening, a reacting member for reacting to the operating pressure, and a transmitting member located between the reacting member and the valve body to transmit the reaction of the reacting member to the valve body, the method comprising the steps of:

fitting a cylindrical cap to a cylindrical portion provided on the housing, wherein the reacting member is located between the cylindrical portion and the cap, and wherein the position of the reacting member is changed by altering the axial position of the cap in relation to the cylindrical portion;

adjusting the axial position of the cap in relation to the cylindrical portion such that the reacting member is positioned at a specific initial position when a pressure having a predetermined magnitude is applied to the control valve; and securing the cap to the cylindrical portion with the reacting member positioned at the initial position.

19. The method according to claim 18, wherein the securing step includes crimping the cap to the cylindrical portion.

20. The method according to claim 18, wherein the securing step includes pinning the cap to the cylindrical portion.

21. The method according to claim 18, wherein the securing step includes welding the cap to the cylindrical portion.

22. The method according to claim 1, wherein the fitting step includes press fitting the cap to the cylindrical portion.

23. A method for assembling a control valve that adjusts the amount of gas flowing in a gas passage in accordance with an operating pressure applied to the control valve, the control valve includes a housing having a valve opening located in the gas passage, a valve body movably accommodated in the housing to adjust the size of the valve opening, a reacting member for reacting to the operating pressure, a transmitting member located between the reacting member and the valve body to transmit the reaction of the reacting member to the valve body, and a solenoid for actuating the valve body, wherein the solenoid biases the valve body with a force based on a value of electric current supplied to the solenoid when the solenoid is excited by the supply of the current, the method comprising the steps of:

fitting a cylindrical cap to a cylindrical portion provided on the housing, wherein the reacting member is located between the cylindrical portion and the cap, and wherein the position of the reacting member is changed by altering the axial position of the cap in relation to the cylindrical portion;

adjusting the axial position of the cap in relation to the cylindrical portion such that the reacting member is positioned at a specific initial position when a pressure having a predetermined magnitude is applied to the control valve and when a current having a predetermined value is supplied to the solenoid; and securing the cap to the cylindrical portion with the reacting member positioned at the initial position.

\* \* \* \* \*

UNITED STATES PATENT AND TRADEMARK OFFICE
CERTIFICATE OF CORRECTION

PATENT NO. : 5,975,859
DATED : November 2, 1999
INVENTOR(S) : Masahiro Kawaguchi et al.

It is certified that error appears in the above-identified patent and that said Letters Patent is hereby corrected as shown below:

Title page,
Column 1, add to item [56] under "U.S. PATENT DOCUMENTS":

| | | | |
|---|---|---|---|
| 5,702,235 | 12/1997 | Hirota et al. | 417/222.2 |
| 5,681,150 | 10/1997 | Kawaguchi et al. | 417/222.2 |
| 5,636,973 | 06/1997 | Sonobe et al. | 417/222.2 |

Column 2,
Line 53, after "present" change "Invention" to --invention--.

Column 4,
Line 8, after "25" insert --.-- (a period);
Line 22, change "awash" to --swash--.

Column 5,
Line 57, after "defined" change "In" to --in--.

Column 7,
Line 22, after "plunger" change "7B" to --78--;
Line 51, after "68" delete "is".

Column 8,
Line 37, after "length" change "or" to --of--.

Column 9,
Line 31, change "commando" to --commands--;
Line 53, change "awash" to --swash--.

Column 10,
Line 9, change "awash" to --swash--;
Line 16, after "hand" insert --,-- (a comma).

UNITED STATES PATENT AND TRADEMARK OFFICE
CERTIFICATE OF CORRECTION

PATENT NO. : 5,975,859
DATED : November 2, 1999
INVENTOR(S) : Masahiro Kawaguchi et al.

It is certified that error appears in the above-identified patent and that said Letters Patent is hereby corrected as shown below:

Column 11,
Line 54, after "position" change "or" to --of--.

Column 14,
Line 5, change "awash" to --swash--;
Line 25, change "form" to --from--.

Column 18,
Line 54, change the semicolon ";" to --:-- (a colon).

Column 19,
Line 12, after "regulates" change "tho" to --the--.

Signed and Sealed this

Thirty-first Day of July, 2001

Nicholas P. Godici

*Attest:*

*Attesting Officer*

NICHOLAS P. GODICI
*Acting Director of the United States Patent and Trademark Office*